United States Patent
Chun

(10) Patent No.: US 12,091,017 B2
(45) Date of Patent: Sep. 17, 2024

(54) VEHICLE AND METHOD OF CONTROLLING THE SAME

(71) Applicants: HYUNDAI MOTOR COMPANY, Seoul (KR); KIA CORPORATION, Seoul (KR)

(72) Inventor: Sangwoo Chun, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 566 days.

(21) Appl. No.: 17/382,906

(22) Filed: Jul. 22, 2021

(65) Prior Publication Data
US 2022/0092319 A1    Mar. 24, 2022

(30) Foreign Application Priority Data
Sep. 18, 2020    (KR) .................. 10-2020-0120530

(51) Int. Cl.
*B60W 40/06*    (2012.01)
*G06V 10/30*    (2022.01)
*G06V 20/58*    (2022.01)

(52) U.S. Cl.
CPC ............ *B60W 40/06* (2013.01); *G06V 10/30* (2022.01)

(58) Field of Classification Search
CPC .. B60W 30/143; B60W 40/06; B60W 40/105; B60W 60/001; B60W 2050/0052; B60W 2050/0059; B60W 2420/403; B60W 2520/10; B60W 2552/35; B60W 2554/00; B60W 2554/80; B60W 2554/802; B60W 2554/805; B60W 2720/10; B60Y 2300/143; G05D 1/0223; G06V 10/30; G06V 20/56; G06V 20/58; G06V 20/625; G06T 7/246; G06T 2207/10016
See application file for complete search history.

(56) References Cited

U.S. PATENT DOCUMENTS 10,106,167 B2 * 10/2018 Mohamed ............. B60W 40/06
11,104,345 B2 *  8/2021 Theodosis ............. B60W 10/22
(Continued)

FOREIGN PATENT DOCUMENTS

KR    10-2013-0123880 A    11/2013
KR    10-2019-0020304 A    2/2019

*Primary Examiner* — Phutthiwat Wongwian
*Assistant Examiner* — Armold Castro
(74) *Attorney, Agent, or Firm* — Morgan, Lewis & Bockius LLP

(57) ABSTRACT

A vehicle may include a camera; a storage; and a controller electrically connected to the camera and the storage. The controller may be configured to obtain a front image of the vehicle from the camera by controlling the camera, in a response to obtaining the front image, to identify image data corresponding to a license plate of a front vehicle positioned in front of the vehicle from the front image, to identify a decrease in a distance between the vehicle and the front vehicle based on the image data and reference distance information corresponding to at least one reference image data of at least one reference license plate stored in the storage, to identify a change in height of the license plate of the front vehicle based on the image data, and based on the decrease in the distance between the vehicle and the front vehicle and the change in height of the license plate of the front vehicle, to identify a speed bump located in front of the vehicle.

17 Claims, 12 Drawing Sheets

(56) References Cited

U.S. PATENT DOCUMENTS

| | | | | |
|---|---|---|---|---|
| 2006/0227011 A1* | 10/2006 | Fripp, II | .............. | G08G 1/0175 |
| | | | | 340/937 |
| 2013/0229517 A1* | 9/2013 | Kozitsky | ................ | G08G 1/054 |
| | | | | 348/148 |
| 2019/0023095 A1* | 1/2019 | Ficca | .................... | B60W 20/15 |
| 2019/0322282 A1* | 10/2019 | Theodosis | ............ | G06V 20/584 |
| 2020/0066145 A1* | 2/2020 | Devor | ................ | G08G 1/054 |

* cited by examiner

FIG. 9

| | SIDE VIEW | VIEW FROM REAR | REFERENCE POINT |
|---|---|---|---|
| FIRST TIME POINT (901) | | | |
| SECOND TIME POINT (903) | | | |
| THIRD TIME POINT (905) | | | |
| FOURTH TIME POINT (907) | | | |
| FIFTH TIME POINT (909) | | | |

VEHICLE AND METHOD OF CONTROLLING THE SAME

CROSS-REFERENCE TO RELATED APPLICATION(S)

The present application claims priority to Korean Patent Application No. 10-2020-0120530, filed on Sep. 18, 2020, the entire contents of which is incorporated herein for all purposes by this reference.

BACKGROUND OF THE INVENTION

Field of the Invention

The disclosure relates to a vehicle and a method of controlling the vehicle.

Description of Related Art

Recently launched vehicles provide services for the safety and convenience of a driver of the vehicle, including components such as a camera, a radio detecting and ranging (radar) and/or a Light Detection And Ranging (LiDAR). For example, the vehicle may provide a monitoring service (also referred to as an around view) that provides an image overlooking from a sky by synthesizing an image obtained through a camera. Furthermore, the vehicle provides a service (also referred to as a drive video record system (DVRS)) that allows the user to check the shock situation by recording the situation before and after the shock using the camera when the vehicle's impact is detected. Furthermore, the vehicle may provide a service (also referred to as an autonomous emergency braking (AEB)) that detects a front of the vehicle using the camera and the radar to rapidly decelerate the vehicle's speed in preparation for a collision. Furthermore, the vehicle may provide a service (also referred to as smart cruise control (SCC)) for maintaining a vehicle distance and a vehicle speed set by the driver by detecting another vehicle driving in front of the vehicle using the radar. Furthermore, the vehicle may provide an autonomous driving service using components such as one or more cameras, radar, and/or LiDAR.

To improve the performance of some of the above-described various services, for example, SCC and autonomous driving service, it is necessary to accurately obtain various information such as lanes, obstacles, and/or speed bumps of a road on which the vehicle is driving. Furthermore, for the driver's safe driving, it may be important to obtain various information on the road being driven. For example, when there is the speed bump while the vehicle is driving, a navigation of the vehicle may provide information that there is the speed bump to the driver of the vehicle. Accordingly, the driver may reduce the speed of the vehicle to minimize an impact such as shaking caused by driving of the speed bump.

In the case of information related to the speed bump among various information related to the road, conventionally, it may be identified based on pattern analysis of an image obtained by receiving from a server of a specific company that specializes in collecting speed cameras, speed bumps, and/or construction sections, or obtained through the camera of the vehicle while the vehicle is driving.

However, in the case of a conventional technology for receiving information related to the speed bump from the server of the specific company, the information related to the speed bump may not be accurate depending on a time when the navigation is updated. For example, when the speed bump is provided on the road after the navigation is updated, information related to the provided speed bump may not be reflected in the navigation. Furthermore, in the case of the conventional technology for identifying the speed bump based on the pattern analysis of the image, there has been a problem in that a portion of the pattern is erased or the speed bump for which the pattern is not displayed cannot be identified.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle configured for identifying a speed bump of a road and a method of controlling the vehicle. For example, it is possible to provide a new method of technology in which the vehicle being driven may identify the speed bump in front of the vehicle, regardless of a conventional navigation update timing and the presence or absence of a speed bump pattern.

Additional aspects of the disclosure will be set forth in part in the description which follows, and in part, will be obvious from the description, or may be learned by practice of the disclosure.

According to an aspect of the disclosure, there is provided a vehicle including: a camera; a storage; and a controller electrically connected to the camera and the storage. The controller may be configured to obtain a front image of the vehicle from the camera by controlling the camera, in response to obtaining the front image, to identify image data corresponding to a license plate of a front vehicle positioned in front of the vehicle from the front image, to identify a decrease in a distance between the vehicle and the front vehicle based on the image data and reference distance information corresponding to at least one reference image data of at least one reference license plate stored in the storage, to identify a change in height of the license plate of the front vehicle based on the image data, and based on the decrease in the distance between the vehicle and the front vehicle and the change in height of the license plate of the front vehicle, to identify a speed bump located in front of the vehicle.

The image data may include a plurality of image data corresponding to a passage of time. The controller may be configured to identify the change in height in a vertical direction of the license plate based on a position comparison of pixel values between the plurality of image data, and to identify a presence of the speed bump in front of the vehicle based on the identification of the change in height of the license plate.

The plurality of image data may include first image data of a first time point, second image data of a second time point after the first time point, and third image data of a third time point after the second time point. The controller may be configured to change a position of pixel values of the second image data in a first vertical direction from a position of pixel values of the first image data, and based on a fact that a position of pixel values of the third image data is a position changed in a second vertical direction opposite to the first vertical direction from the position of the pixel values of the second image data, to identify that the license plate of a first height is changed to the first height after changing in a downward direction thereof.

The plurality of image data may include fourth image data of a fourth time point after the third time point, and fifth image data of a fifth time point after the fourth time point. The controller may be configured to change a position of pixel values of the fourth image data in the second vertical direction from the position of pixel values of the third image data, and based on a fact that a position of pixel values of the fifth image data is the position changed in the first vertical direction from the position of the pixel values of the fourth image data, to identify that the license plate of a first height is changed to the first height after changing in an upward direction thereof.

In response to identification of the change in height of the license plate of the front vehicle, the controller may be configured to identify a distance between the vehicle and the speed bump based on at least one of the plurality of image data corresponding to the change in height of the license plate and the reference distance information corresponding to the at least one reference image data of the at least one reference license plate stored in the storage.

The controller may be configured to generate a pattern corresponding to the change in height of the license plate over a passage of time, to remove a noise in the pattern corresponding to the change in height of the license plate based on a predetermined noise filter, and to identify a position of the speed bump located in front of the vehicle based on the noise-removed pattern.

The controller may be configured to determine a driving speed of the front vehicle based on a driving speed of the vehicle and a change in a distance between the vehicle and the front vehicle, to identify an elapsed time from a time point at which the license plate of a first height is changed in a downward direction and then starts to change to the first height again to a time point at which the license plate is changed in an upward direction and then starts to change to the first height again, and to determine a height of the speed bump based on the driving speed of the front vehicle and the elapsed time of the front vehicle.

The controller may be configured to determine a distance between a front wheel axis and a rear wheel axis of the front vehicle based on the driving speed of the front vehicle and the elapsed time of the front vehicle, to determine a difference value between the first height of the license plate and a second height of the license plate changed in the upward direction, and to determine the height of the speed bump based on the distance between the front wheel axis and the rear wheel axis, the difference value, and a predetermined distance between the rear wheel axle and the license plate.

The controller may be configured to control a driving speed of the vehicle based on the identification of the speed bump.

According to another aspect of the disclosure, there is provided a method of controlling a vehicle including: obtaining, by a controller, a front image of the vehicle; in a response to obtaining the front image, identifying, by the controller, image data corresponding to a license plate of a front vehicle of the vehicle from the front image; identifying, by the controller, a decrease in a distance between the vehicle and the front vehicle based on the image data and reference distance information corresponding to at least one reference image data of at least one reference license plate stored in a storage; identifying, by the controller, a change in height of the license plate of the front vehicle based on the image data; and based on the decrease in the distance between the vehicle and the front vehicle and the change in height of the license plate of the front vehicle, identifying, by the controller, a speed bump located in front of the vehicle.

The image data may include a plurality of image data corresponding to a passage of time. The identifying of the speed bump located in front of the vehicle may include identifying the change in height in a vertical direction of the license plate based on a position comparison of pixel values between the plurality of image data, and identifying a presence of the speed bump in front of the vehicle based on the identification of the change in height of the license plate.

The plurality of image data may include first image data of a first time point, second image data of a second time point after the first time point, and third image data of a third time point after the second time point. The identifying of the change in height of the license may include changing a position of pixel values of the second image data in a first vertical direction from a position of pixel values of the first image data, and based on a fact that a position of pixel values of the third image data is a position changed in a second vertical direction opposite to the first vertical direction from the position of the pixel values of the second image data, identifying that the license plate of a first height is changed to the first height after changing in a downward direction thereof.

The plurality of image data may include fourth image data of a fourth time point after the third time point, and fifth image data of a fifth time point after the fourth time point. The identifying of the change in height of the license may include changing a position of pixel values of the fourth image data in the second vertical direction from a position of pixel values of the third image data, and based on a fact that a position of pixel values of the fifth image data is the position changed in the first vertical direction from the position of the pixel values of the fourth image data, identifying that the license plate of a first height is changed to the first height after changing in an upward direction thereof.

The method may further include, in a response to identification of the change in height of the license plate of the front vehicle, identifying, by the controller, a distance between the vehicle and the speed bump based on at least one of the plurality of image data corresponding to the change in height of the license plate and the reference distance information corresponding to the at least one reference image data of the at least one reference license plate stored in the storage.

The identifying of the speed bump located in front of the vehicle may include generating a pattern corresponding to the change in height of the license plate over a passage of time; removing a noise in the pattern corresponding to the change in height of the license plate via a predetermined noise filter; and identifying a position of the speed bump located in front of the vehicle based on the noise-removed pattern.

The method may further include determining, by the controller, a driving speed of the front vehicle based on a driving speed of the vehicle and a change in a distance between the vehicle and the front vehicle; identifying, by the controller, an elapsed time from a time point at which the license plate of a first height is changed in a downward direction and then starts to change to the first height again to a time point at which the license plate is changed in an upward direction and then starts to change to the first height again; and determining, by the controller, a height of the speed bump based on the driving speed of the front vehicle and the elapsed time of the front vehicle.

The determining of the height of the speed bump may include determining a distance between a front wheel axis and a rear wheel axis of the front vehicle based on the driving speed of the front vehicle and the elapsed time of the front vehicle; determining a difference value between a first height of the license plate and a second height of the license plate changed in the upward direction; and determining the height of the speed bump based on the distance between the front wheel axis and the rear wheel axis, the difference value, and a predetermined distance between the rear wheel axle and the license plate.

The method may further include controlling, by the controller, a driving speed of the vehicle based on the identification of the speed bump.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 9 is a view exemplarily illustrating an image of a front vehicle driving on a speed bump according to various exemplary embodiments of the present invention.

Figure 1:
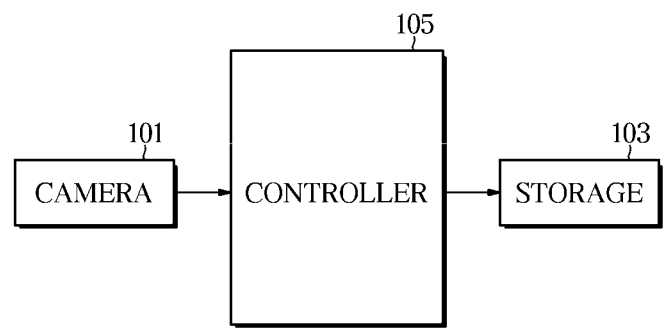
FIG. 1 is a block diagram of a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Like reference numerals refer to like elements throughout the specification. Not all elements of the exemplary embodiments of the disclosure will be described, and the description of what are commonly known in the art or what overlap each other in the exemplary embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the disclosure will be described with reference to accompanying drawings.

Figure 2:
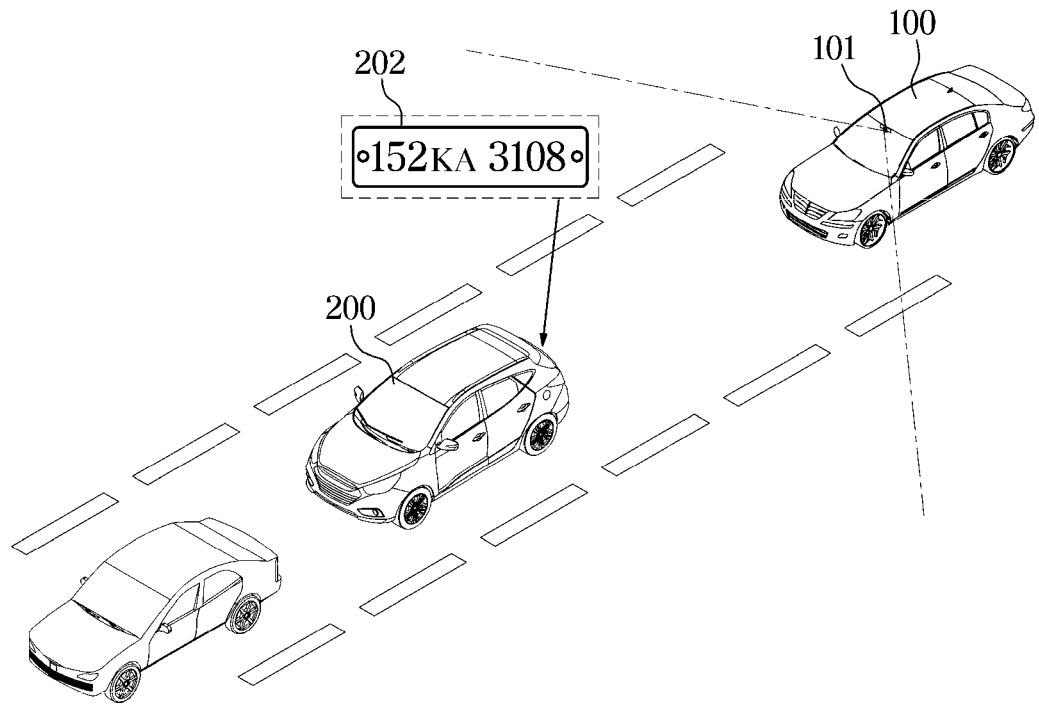
FIG. 2 is a view for describing an operation of a vehicle according to various exemplary embodiments of the present invention.

FIG. 1 is a block diagram of a vehicle according to various exemplary embodiments of the present invention, and FIG. 2 is a view for describing an operation of a vehicle according to various exemplary embodiments of the present invention.

Referring to FIG. 1, a vehicle 100 may include at least one camera 101, a storage 103 or a controller 105.

The at least one camera 101 may capture a still image and a video. The at least one camera 101 may include at least one image sensor, and may obtain (or capture) an image around the vehicle 100 based on a control of the controller 105.

For example, the at least one camera 101 may include a drive video record system (DVRS), and may be disposed adjacent to a rearview mirror of the vehicle 100.

The storage 103 may be implemented with at least one of the non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as a hard disk drive (HDD) or a compact disk (CD) ROM, without being limited thereto.

The controller 105 (also referred to as the control circuit or processor) may control at least one other component of the vehicle 100 (e.g., the hardware component (e.g., camera 101 or storage 103)) or the software component (software program)), and may perform various data processing and operations. The controller 105 may include an electronic control unit (ECU) that controls a power system of the vehicle 100. The controller 105 may include the processor and the memory.

Referring to FIG. 2, the controller 105 may identify a license plate 202 of a front vehicle 200 located in front of the vehicle 100.

The controller 105 may obtain a front image of the vehicle 200 by controlling the camera 101 while the vehicle 100 is driving. The controller 101 may identify the license plate 202 of the front vehicle 200 based on image analysis of the front image. Based on the identification of the license plate 202 of the front vehicle 200, the controller 105 may identify a distance from the front vehicle 200 and whether the front vehicle 200 has passed a speed bump while driving. The controller 105 may identify that there is the speed bump in front of the vehicle 100 based on the identification of passing the speed bump of the front vehicle 200. For example, the controller 105 may identify the distance between the vehicle 100 and the speed bump and a height of the speed bump.

The controller 101 may identify (or extract) image data corresponding to the license plate of the front vehicle 200 from the front image based on reference image data corresponding to each of a plurality of reference license plates stored in the storage 103. The controller 101 may identify passing through the speed bump of the front vehicle 200 based on reference distance information and/or reference position information corresponding to each of predetermined reference image sizes for the reference image data corresponding to each of the plurality of reference license plates stored in the storage 103. The reference distance information may include information related to a separation distance between the vehicle 100 and the front vehicle 200, and the reference position information may include information related in a direction in which the front vehicle 200 is located with respect to the vehicle 100.

Figure 3:
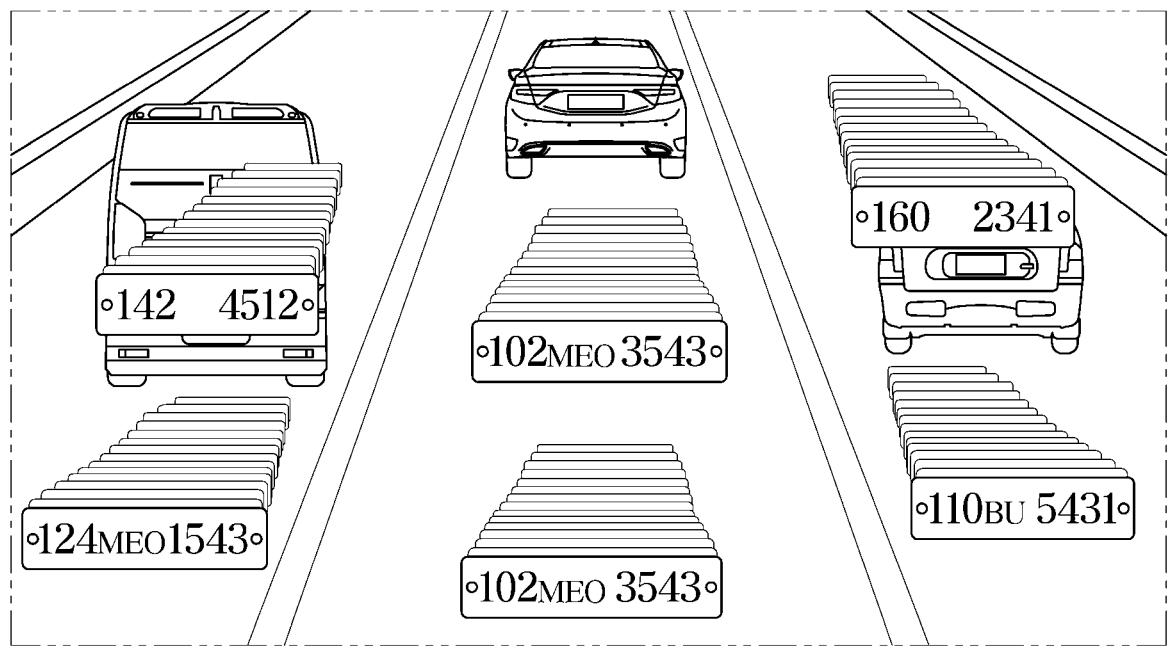
FIG. 3 and FIG. 4 are views for describing an operation of obtaining reference image data of a license plate corresponding to each of a plurality of positions and separation distances and determining a reference image size of the license plate for each reference license plate according to various exemplary embodiments of the present invention.
Figure 4:
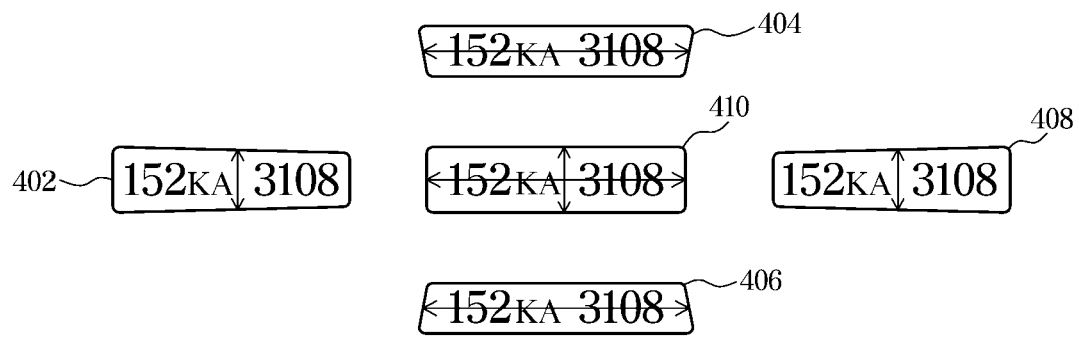

FIG. 3 and FIG. 4 are views for describing an operation of obtaining reference image data of a license plate corresponding to each of a plurality of positions and separation distances and determining a reference image size of the license plate for each reference license plate according to various exemplary embodiments of the present invention.

Referring to FIG. 3, the vehicle 100 or a separate device may control an arbitrary camera, for example, the camera 101 of the vehicle 100 in a state the arbitrary camera is fixed at specific position, for example, in a state in which the vehicle 100 is stopped at the specific position, and the vehicle 100 may obtain image data for each position information and distance information for front vehicles having different types of license plates as illustrated in FIG. 3. Accordingly, for each standard license plate, the image data of the license plate and/or the size of the license plate corresponding to each of a plurality of predetermined reference positions and reference separation distances may be converted into data as the reference image data and the reference image size of the license plate.

Referring to FIG. 4, depending on the position and movement of the front vehicles, a shape of the obtained reference image data of the license plate may be in various shapes rather than a complete rectangle. For example, the vehicle 100 or the separate device may obtain first reference image data 402, 404, 406, and 408 in FIG. 4 when the front vehicle rotates or drives on a slope. Furthermore, the vehicle 100 or the separate device may obtain second reference image data 410 in FIG. 4 when the front vehicle drives in a straight line on a flat road. When comparing the first reference image data 402, 404, 406, 408 and the second reference image data 410, the first reference image data 402, 404, 406, 408 may have a different shape and/or size from the second reference image data 410, but horizontal and/or vertical lengths of the first reference image data 402, 404, 406, and 408 and the second reference image data 410 may be constant from each other and may not change extremely.

Through a number of simulations that obtain the plurality of reference image data corresponding to the license plate of the front vehicle under various conditions as illustrated in FIG. 4, the plurality of reference positions and/or reference separation distances may be predetermined for each of the reference license plates of different types. Furthermore, for each reference license plate, the reference image data of the license plate and/or the image size of the license plate corresponding to each of a plurality of predetermined reference positions and/or reference separation distances may be predetermined. The reference image data of the license plate may include contour image data configured for representing the shape and size of the reference license plate. The separation distance may correspond to the distance between the vehicle 100 and the front vehicle 200. Accordingly, the storage 103 may store reference distance information and/or reference position information corresponding to each of predetermined reference image sizes for reference image data of each of the plurality of reference license plates.

Figure 5:
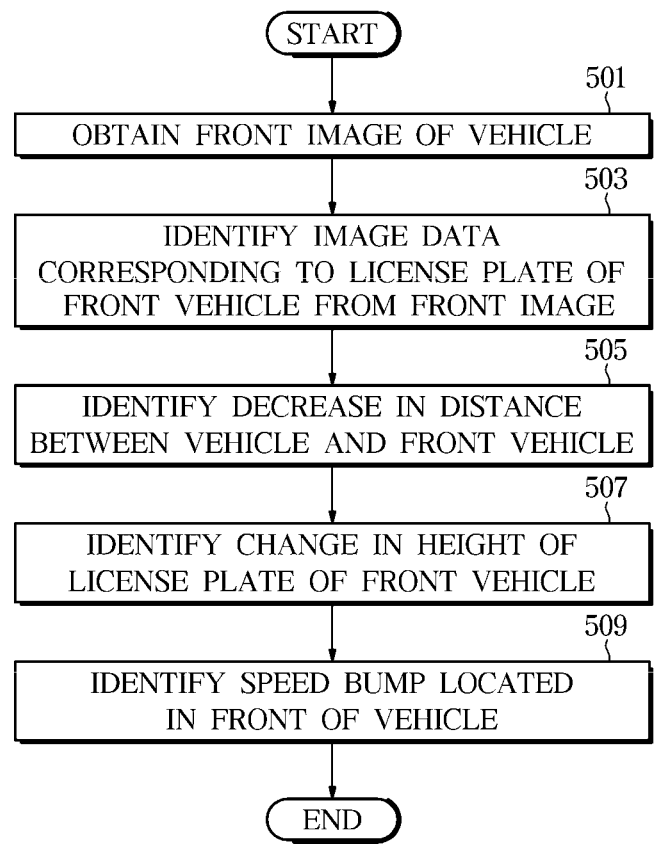
FIG. 5 is a view for describing an operation of a vehicle according to various exemplary embodiments of the present invention.

FIG. 5 is a view for describing an operation of a vehicle according to various exemplary embodiments of the present invention.

The vehicle 100 may obtain the front image of the vehicle 100 (501).

The vehicle 100 may obtain the front image of the vehicle 100 by controlling the camera 101 while driving. For example, the vehicle 100 may obtain the front image of the vehicle 100 in real time or periodically while driving.

The vehicle 100 may identify the image data corresponding to the license plate 202 of the front vehicle 200 from the front image (503).

The vehicle 100 may identify the image data corresponding to the license plate 202 of the front vehicle 200 in the front image based on the reference image data corresponding to each of the plurality of reference license plates stored in the storage 103. For example, the vehicle 100 may identify the image data corresponding to each time as time passes.

Figure 6:
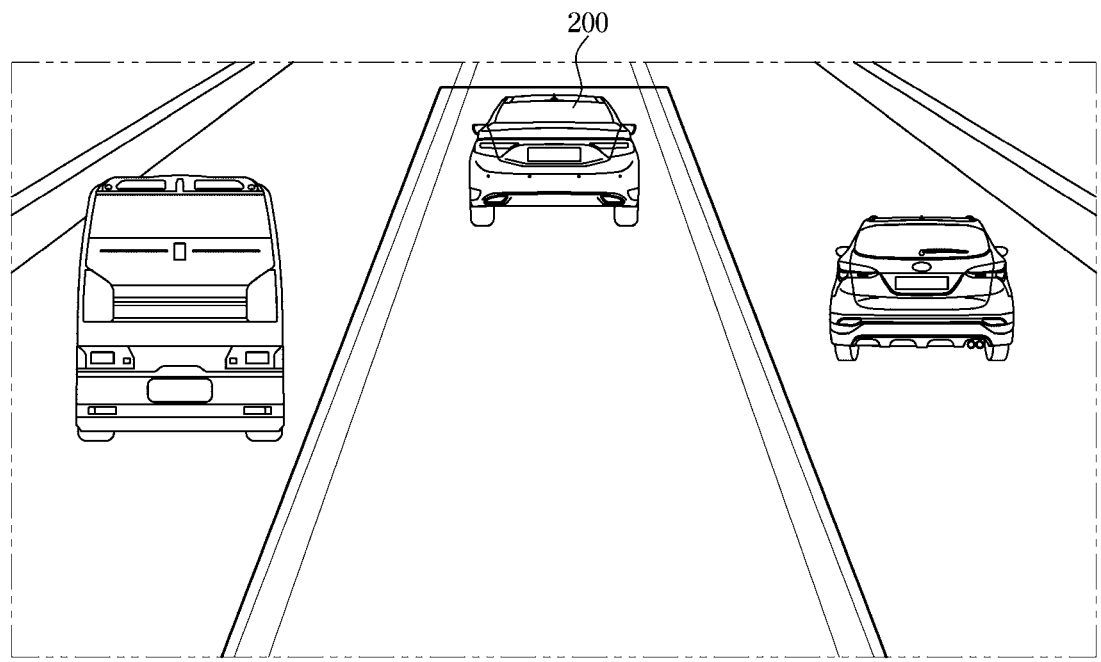
FIG. 6 is a view exemplarily illustrating a front vehicle according to various exemplary embodiments of the present invention.

Referring to FIG. 6, the vehicle 100 may continuously identify square contour image data corresponding to the license plate 202 of the front vehicle 200 driving in the same lane as the vehicle 100 from the obtained front image. When the vehicle 100 identifies the square contour image data corresponding to the license plate 202 of the front vehicle 200, the square image data around the license plate 202 may be ignored.

Figure 7:
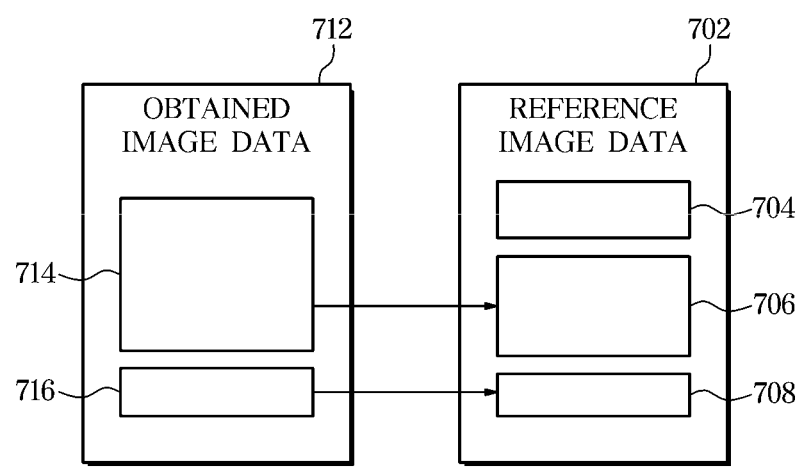
FIG. 7 and FIG. 8 are views for describing an operation of identifying image data corresponding to a license plate of a front vehicle according to various exemplary embodiments of the present invention.

Referring to FIG. 7, the vehicle 100 may obtain image data 712 including contour image data 714 and 716 of the license plate 202 of the front vehicle 200. The reference image data 702 stored in the storage 103 may include reference contour image data 704, 706, and 708. The vehicle 100 may identify the corresponding contour image data 706 and 708 of the corresponding reference license plate based on the aspect ratio of the contour image data 714 and 716 of the license plate of the front vehicle 200. For example, the vehicle 100 may identify the second reference contour image data 706 and the third reference contour image data 708 having the closest aspect ratio within a predetermined reference error range corresponding to the aspect ratio of each of the first contour image data 714 and the second contour image data 716 among the reference contour image data 704, 706, and 708. The vehicle 100 may identify the second reference contour image data 706 and the third reference contour image data 708 as image data corresponding to the license plate 202 of the front vehicle 200.

Figure 8:
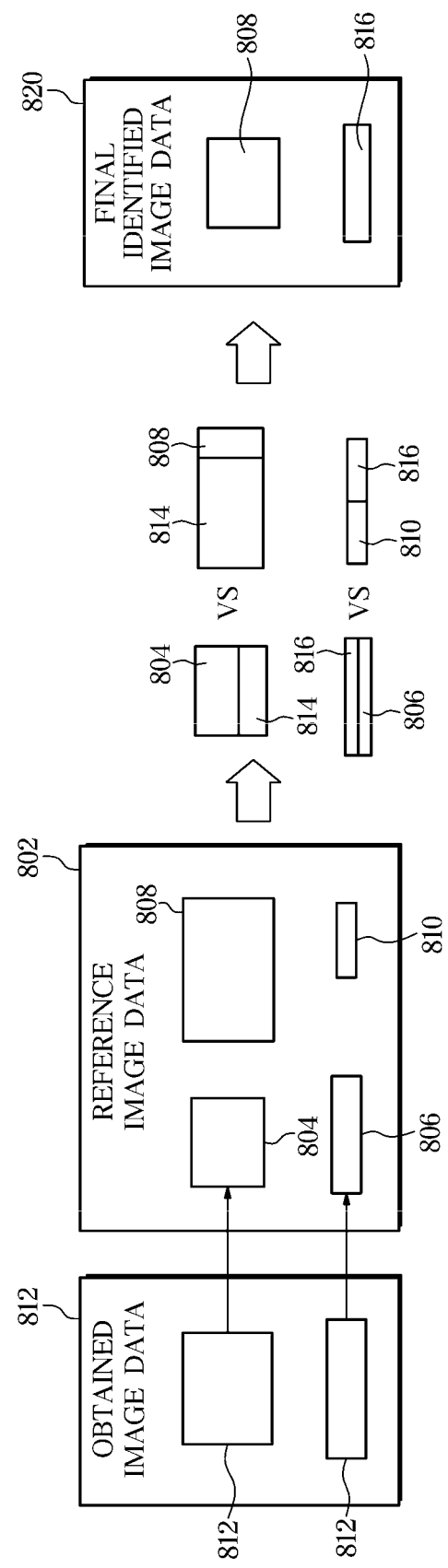

Referring to FIG. 8, the vehicle 100 may obtain image data 812 including contour image data 814 and 816 of the license plate 202 of the front vehicle 200. The reference image data 802 stored in the storage 103 may include reference contour image data 804, 806, 808 and 810. The vehicle 100 may identify the corresponding contour image data 804, 806, 808 and 810 of the corresponding reference license plate based on the aspect ratio of the contour image data 814 and 816 of the license plate of the front vehicle 200. For example, the vehicle 100 may identify the fourth reference contour image data 804 and the fifth reference contour image data 808 having an aspect ratio similar to the aspect ratio of the third contour image data 814 among the reference contour image data 804, 806, 808, and 810. The vehicle 100 may identify the fifth reference contour image data 808 having an aspect ratio similar to the aspect ratio of the third contour image data 814 among the fourth reference contour image data 804 and the fifth reference contour image data 808 as the image data corresponding to the license plate 202 of the front vehicle 200. Furthermore, the vehicle 100 may identify the fifth reference contour image data 808 and the sixth reference contour image data 810 having an aspect ratio similar to the aspect ratio of the fourth contour image data 816 among the reference contour image data 804, 806, 808, and 810. The fifth reference contour image data 806 and the sixth reference contour image data 810 may both deviate from a predetermined reference error range. In the instant case, the vehicle 100 may identify the fourth contour image data 816 as the image data corresponding to the license plate 202 of the front vehicle 200.

The vehicle 100 may identify a decrease in distance between vehicle 100 and the front vehicle 200 (505).

The storage 103 may store reference image data for each of the plurality of reference license plates, and may store the reference distance information corresponding to each of the reference image data. For example, the shape and image size of the reference image data may be predetermined.

The vehicle 100 may identify the decrease in distance between the vehicle 100 and the front vehicle 200 based on the image data and the reference distance information corresponding to each of the reference image data of the plurality of reference license plates stored in the storage 103.

For example, the vehicle 100 may identify the reference image data corresponding to the image data from among the reference image data corresponding to each of the plurality of reference license plates based on the shape and image size of the image data. The vehicle 100 may identify the reference distance information corresponding to the identified reference image data as distance information between the vehicle 100 and the front vehicle. The vehicle 100 may identify distance information in real time or periodically while driving. Accordingly, the vehicle 100 may identify the decrease in distance between the vehicle 100 and the front vehicle 200.

For example, the decrease in distance between the vehicle 100 and the front vehicle 200 may have reasons such as an increase in speed of the vehicle 100 or a decrease in speed of the front vehicle 200. When the front vehicle 200 decreases the speed to pass through the speed bump, the distance between the vehicle 100 and the front vehicle 200 decreases. Accordingly, in the exemplary embodiment of the disclosure, it may be identified whether the distance between the vehicle 200 and the front vehicle 200 is reduced.

The vehicle 100 may identify a change in height of the license plate 202 of the front vehicle 200 based on the image data (507).

Based on a position comparison of pixel values between a plurality of image data, the vehicle 100 may identify the change in height of the license plate 202 that changes back to a first height after the license plate 202 of the first height is changed in a downward direction thereof, and then changes back to the first height after the license plate 202 is changed in an upward direction thereof. The vehicle 100 may identify that there is the speed bump in front of the vehicle 100 based on the identification of the change in height of the license plate 202. For example, the first height may include a height when the front vehicle 100 drives on a road in a flat section.

When the front vehicle 200 located in front of the vehicle 100 passes the speed bump while driving, the change in height of the license plate 202 of the front vehicle 200 and a change in image data of the license plate 202 based on the change in height of the license plate 202 of the front vehicle 200 will be described with reference to FIG. 9.

FIG. 9 is a view exemplarily illustrating an image of a front vehicle driving on a speed bump according to various exemplary embodiments of the present invention.

Referring to FIG. 9, while the front vehicle 200 of the vehicle 100 is driving on a flat section of a road 900, for example, at a first time point 901, the vehicle 100 may be in a correct position as illustrated in FIG. 9. In the instant case, the vehicle 100 may set the height of the license plate image of the front vehicle 200 as a reference point 914.

While a front wheel of the front vehicle 200 spans the speed bump 912 so that the front vehicle 200 crosses the speed bump of the road 900, for example, at a second time point 903, the height of the license plate 202 of the front vehicle 200 may be lower than the reference point 914. Thereafter, when the front wheel of the front vehicle 200 completes the passage of the speed bump 912, for example, at a third time point 905, the height of the license plate 202 of the front vehicle 200 may be a height corresponding to (or the same or similar) the reference point 914. Thereafter, a rear wheel of the front vehicle 200 may span the speed bump 912, and while the rear wheel of the front vehicle 200 spans the speed bump 912, for example, at a fourth time point 907, the height of the license plate 202 of the front vehicle 200 may be higher than the reference point 914. Thereafter, when the rear wheel of the front vehicle 200 completes the passage of the speed bump 912, for example, at the fourth time point 909, the height of the license plate 202 of the front vehicle 200 may be a height corresponding to the reference point 914t.

Figure 10:
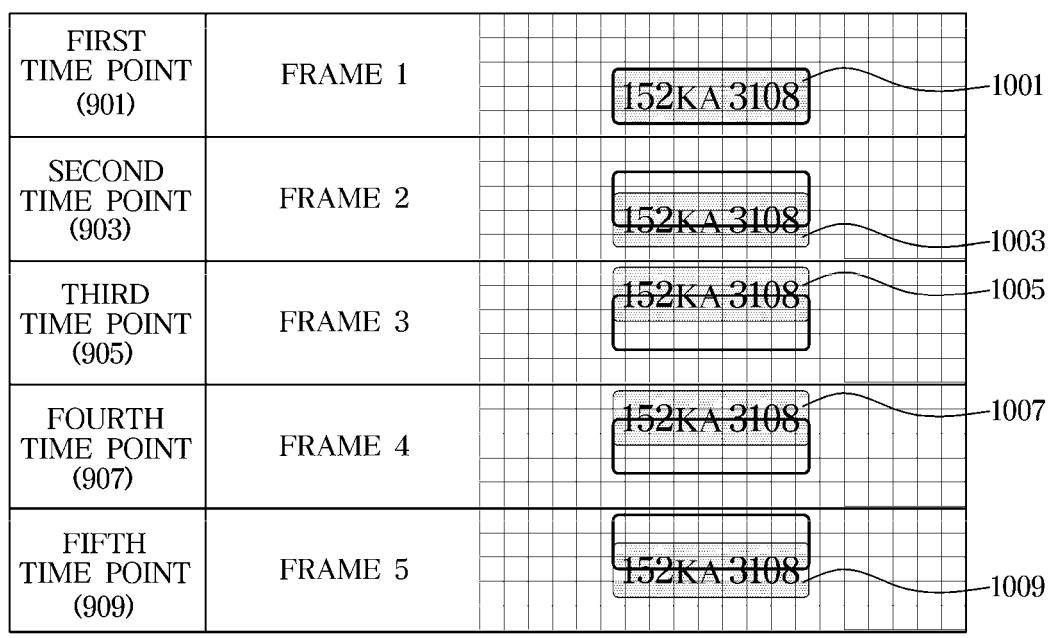
FIG. 10 is a view exemplarily illustrating image data corresponding to a license plate of a front vehicle passing through a speed bump according to various exemplary embodiments of the present invention.

When the front vehicle 200 passes through the speed bump 912 as illustrated in FIG. 9 described above, the vehicle 100 may obtain the plurality of image data corresponding to the license plate 202 of the front vehicle 200 over time, as illustrated in FIG. 10.

FIG. 10 is a view exemplarily illustrating image data corresponding to a license plate of a front vehicle passing through a speed bump according to various exemplary embodiments of the present invention.

Referring to FIG. 10, the vehicle 100 may obtain first image data at the first time point 901, and the first image data may be included in a first frame FRAME 1. The vehicle 100 may identify positions of pixel values corresponding to a license plate area in the first frame, that is, pixels. The vehicle 100 may obtain second image data at the second time point 903 after the first time point 901, and the second image data may be included in a second frame FRAME 2. The vehicle 100 may identify positions of pixel values corresponding to a license plate area in the second frame, that is, pixels. The vehicle 100 may identify that the positions of the pixel values corresponding to the license plate area at the second time point 903 have changed from the positions of the pixel values corresponding to the license plate area at the first time point 901 to a first vertical direction thereof, that is, the downward direction thereof. The vehicle 100 may obtain third image data at the third time point 905 after the second time point 903, and the third image data may be included in a third frame FRAME 3. The vehicle 100 may identify positions of pixel values corresponding to a license plate area in the third frame, that is, pixels. The vehicle 100 may identify that the positions of the pixel values corresponding to the license plate area at the third time point 905 have changed from the positions of the pixel values corresponding to the license plate area at the second time point 903 to a second vertical direction thereof, that is, the upward direction. The vehicle 100 may obtain fourth image data at the fourth time point 907 after the third time point 903, and the fourth image data may be included in a fourth frame FRAME 4. The vehicle 100 may identify positions of pixel values corresponding to a license plate area in the fourth frame, that is, pixels. The vehicle 100 may identify that the positions of the pixel values corresponding to the license plate area at the fourth time point 907 have changed from the positions of the pixel values corresponding to the license plate area at the third time point 905 to the second vertical direction thereof. The vehicle 100 may identify the positions of pixel values corresponding to the license plate area at a fifth time point 909 after the fourth time point 907, that is, pixels. The vehicle 100 may identify that the positions of the pixel values corresponding to the license plate area at the fifth time point 909 have changed from the positions of the pixel values corresponding to the license plate area at the fourth time point 907 to the first vertical direction thereof.

Figure 11:
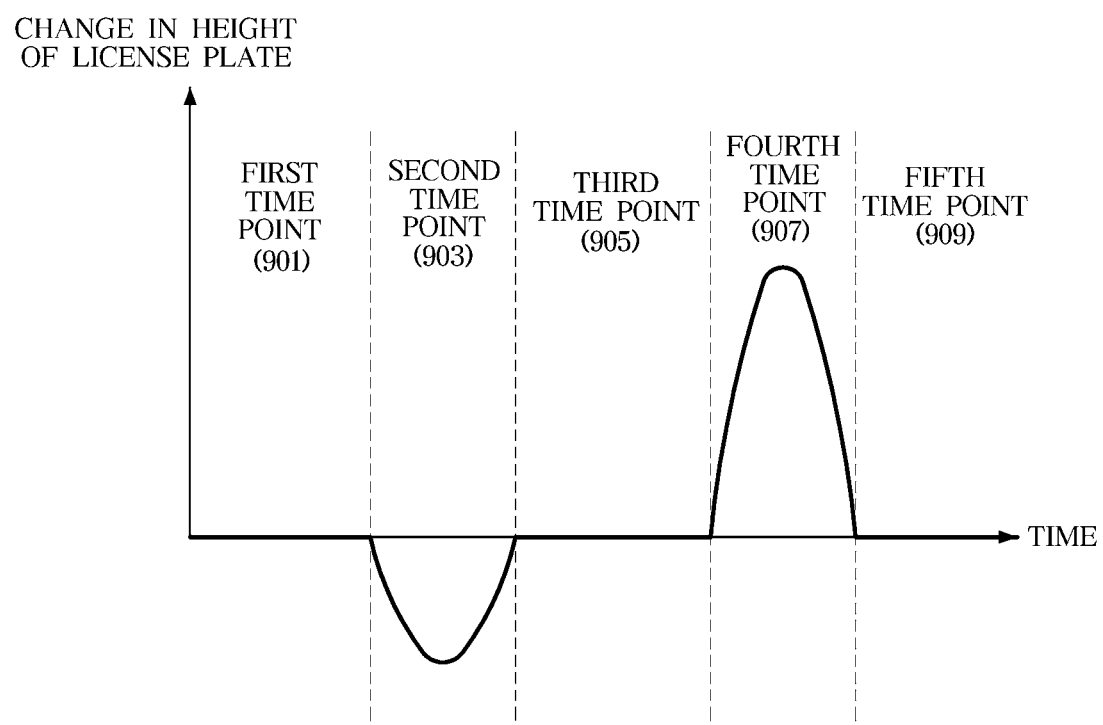
FIG. 11 is a graph illustrating a height change pattern of a license plate of a front vehicle passing through a speed bump according to various exemplary embodiments of the present invention.

As described above, as the front vehicle 200 passes through the speed bump, the vehicle 100 may represent the change in height of the license plate 202 of the front vehicle 200 in a form of a graph as illustrated in FIG. 11.

FIG. 11 is a graph illustrating a height change pattern of a license plate of a front vehicle passing through a speed bump according to various exemplary embodiments of the present invention.

Referring to FIG. 11, the vehicle 100 may generate a pattern corresponding to the change in height of the license plate 202 over time.

By the vehicle 100, the license plate 202 of the front vehicle 200 at the first time point 901 may be identified as being located in an original position, for example, at a first height. The first height may be determined as a zero point. For example, the zero point at the change in height of the license plate 202 of the front vehicle 200 may be an average of up to x seconds before the front vehicle 200 passes through the speed bump, for example, before the change in height is large as illustrated in the second time point 903 in the graph of FIG. 10.

By the vehicle 100, it may be identified that the license plate 202 of the front vehicle 200 at the second time point 903 is located at a height slightly lowered from the first height in the downward direction thereof. Further, by the vehicle 100, it may be identified that the license plate 202 of the front vehicle 200 at the third time point 905 is changed in position and is again located at the first height. Thereafter, by the vehicle 100, it may be identified that the height of the license plate 202 of the front vehicle 200 at the fourth time point 907 is at a position changed from the original position to the upward direction. According to the According to the change in height of the license plate 202 at the second time point 903 and the fourth time point 907 in the graph of FIG. 10, in may be identified that a change rate in height may be greater when the rear wheel of the front vehicle 200 passes through the speed bump than when the front wheel of the front vehicle 200 passes through the speed bump. Thereafter, it may be identified by the vehicle 100 that the license plate 202 of the front vehicle 200 at the fifth time point 909 is located at the first height again.

The vehicle 100 may identify the speed bump located in front of the vehicle 100 (509).

The vehicle 100 may identify the speed bump located in front of the vehicle 100 based on the change in height of the license plate of the front vehicle 200 in a response to the decrease in distance between the vehicle 100 and the front vehicle 200. For example, after the decrease in distance between the vehicle 100 and the front vehicle 200, the vehicle 100 may be changed back to the first height after the license plate 202 of the first height of the front vehicle 200 is changed in the downward direction thereof. Thereafter, when identifying the change in height of the license plate 202, which is changed back to the first height after the license plate 202 is changed upward, it may be identified that the front vehicle 200 has passed the speed bump. For example, the vehicle 100 may identify that the front vehicle 200 has passed the speed bump based on a pattern corresponding to the change in height of the license plate 202 over time in FIG. 11.

The vehicle 100 may identify that the speed bump is located in front of the vehicle 100 according to the according to the identification of passing the speed bump of the front vehicle 200.

Figure 12A:
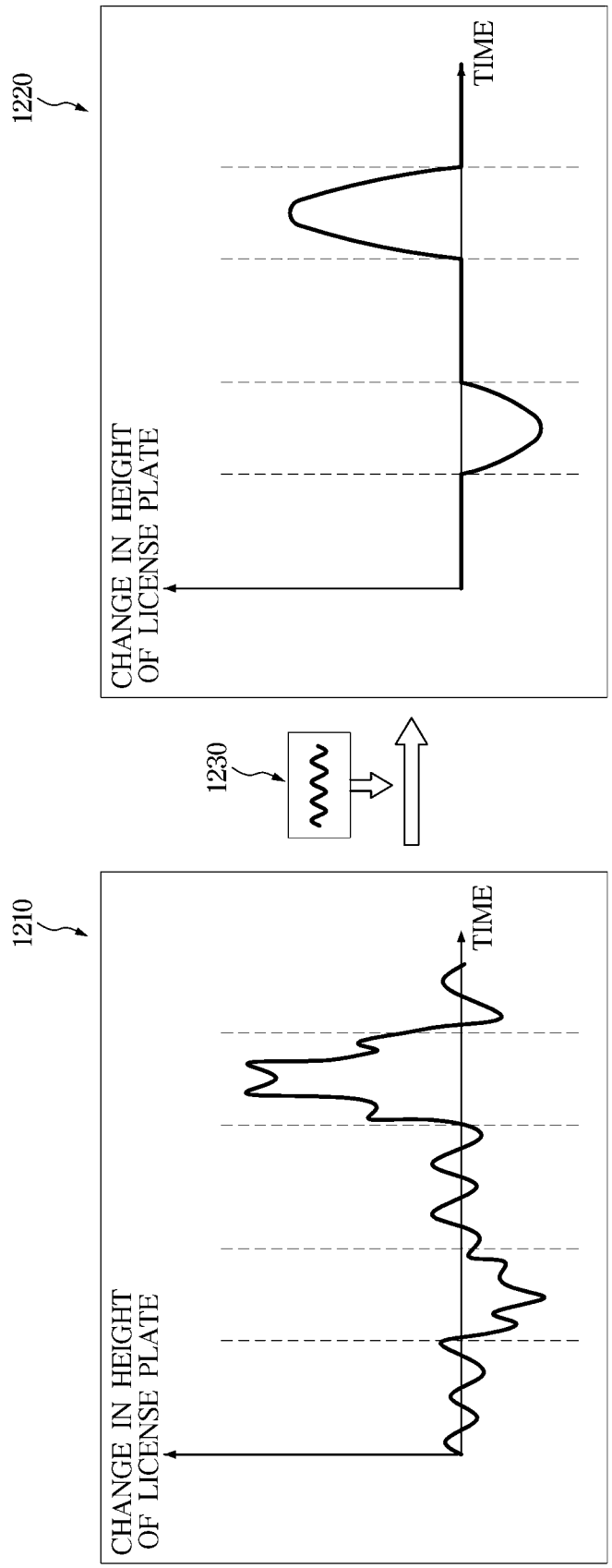
FIG. 12A and FIG. 12B are views for describing an operation of generating a graph of a pattern representing a change in height of a license plate of a front vehicle from which noise is removed, according to various exemplary embodiments of the present invention.
Figure 12B:
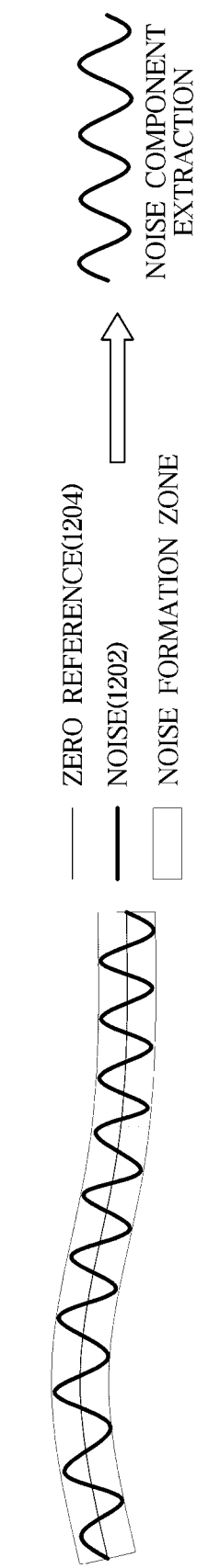

Furthermore, the above-described graph of the pattern of FIG. 11 may be obtained by removing the noise from the graph 1210 of the pattern indicating the change in height of the license plate 202 actually generated by the vehicle 100. Referring to FIG. 12A and FIG. 12B, operations of removing the noise from a graph 1210 of the pattern indicating change in height of the license plate 202 will be described in detail.

FIG. 12A and FIG. 12B are views for describing an operation of generating a graph of a pattern representing a change in height of a license plate of a front vehicle from which noise is removed, according to various exemplary embodiments of the present invention.

For example, the vehicle 100 may remove the noise of the pattern corresponding to the change in height of the license plate 202 based on a predetermined noise filter.

The front vehicle 200 may vibrate itself by the engine or the like. In the case of self-vibration of the front vehicle 200, it may be noise in the change in height of the license plate 202, including a constant vibration period and/or amplitude. Accordingly, the vehicle 100 may generate a noise filter 1230 for filtering the noise.

For example, the vehicle 100 may determine the height of the license plate 202 of front vehicle 200 corresponding to just before the front vehicle 200 crosses the speed bump as a zero reference of the change in height of the license plate 202. The vehicle 100 may determine the vibration frequency and vibration amplitude of the front vehicle 200 based on a movement of the license plate 202 in a constant vertical direction thereof.

The vehicle 100 may extract a noise 1202 component based on a zero reference 1204 determined as illustrated in FIG. 12B and the determined vibration frequency and vibration amplitude. The vehicle 100 may generate the noise filter 1230 applicable to a graph indicating the change in height of the license plate 202 of the front vehicle 200 based on the extracted noise 1202 component.

For example, the vehicle 100 may generate of the pattern indicating the change in height of the license plate 202 of the front vehicle 100 including the noise 1202 component according to the according to the vibration of the vehicle 200, as illustrated in FIG. 12A according to the according to the same operation as the above-described embodiment.

The vehicle 100 may generate the graph 1210 indicating the change in height of the plate 202 of the front vehicle 100 from which the noise component has been removed by applying the noise filter 1230 to the graph 1210 of the pattern indicating the change in height of the license plate 202 of the front vehicle.

Figure 13A:
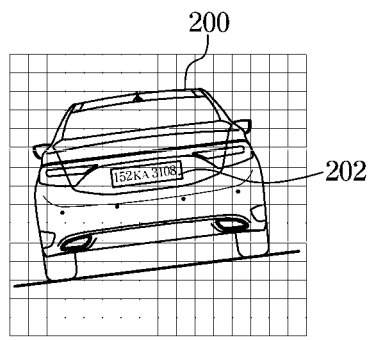
FIG. 13A, FIG. 13B, and FIG. 13C are views exemplarily illustrating an image of a front vehicle according to a road surface condition of a road according to various exemplary embodiments of the present invention.
Figure 13B:
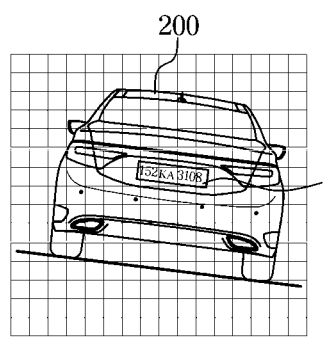

Furthermore, in addition to the above-described embodiment, the vehicle 100 may identify that the front vehicle 200 and the license plate 202 of the front vehicle 200 have different inclinations as illustrated in FIG. 13A and FIG. 13B according to a road surface condition of the road other than the speed bump, preventing misrecognition that the front vehicle 200 passes through the speed bump.

Figure 13C:
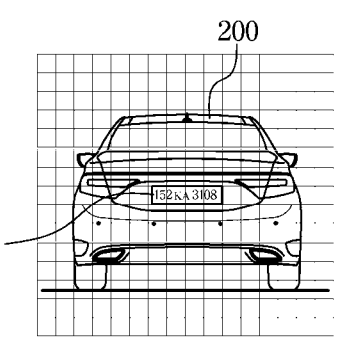

FIG. 13A to FIG. 13C are views exemplarily illustrating an image of a front vehicle according to a road surface condition of a road according to various exemplary embodiments of the present invention.

Referring to FIG. 13A to FIG. 13C, when the front vehicle 200 shakes according to the according to the road surface condition, the license plate 202 of the front vehicle 200 may be deflected and inclined. For example, the front vehicle 200 may be inclined to a left at an instant as illustrated in FIG. 13A, according to the road surface of the road, and may be inclined to a right at an instant as illustrated in FIG. 13B. When the front vehicle 200 is deflected and inclined as illustrated in FIGS. 13A and 13B, which is not in a general state as in FIG. 13C, the vehicle 100 may identify that the front vehicle 200 is shaken by the road surface of the road and not the speed bump, and thus may be excluded from an identification condition of the speed bump. For example, when it is determined that the positions of pixel values between the two image data are different in a horizontal direction thereof, the vehicle 100 may identify that the front vehicle 200 does not pass through the speed bump.

Figure 14:
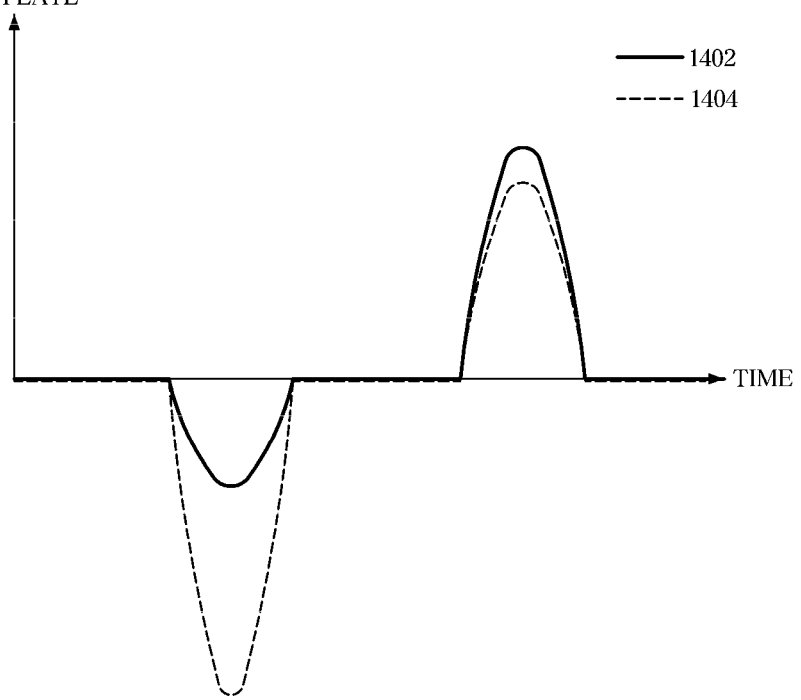
FIG. 14 is a view exemplarily illustrating a graph of a pattern corresponding to a change in height of a license plate of a front vehicle when passing through a speed bump of the front vehicle and passing through the speed bump of a vehicle.

Furthermore, even when the vehicle 100 passes through the speed bump, the vehicle 100 may misrecognize that the license plate 202 of the front vehicle 200 actually moves in the vertical direction based on the obtained plurality of image data. Referring to FIG. 14, an operation of preventing misrecognition of the license plate 202 of the front vehicle 200 as moving in the vertical direction according to the according to the passage of the speed bump of the vehicle 100 will be described.

FIG. 14 is a view exemplarily illustrating a graph of a pattern corresponding to a change in height of a license plate of a front vehicle when passing through a speed bump of the front vehicle and passing through the speed bump of a vehicle.

Referring to FIG. 4, when comparing a pattern 1402 corresponding to the change in height of the license plate 202 of the front vehicle 200 generated by the vehicle 100 according to the according to the passage of the speed bump of the front vehicle 200, it may be confirmed that the similarity. However, when the vehicle 100 passes the speed bump, since the camera 101 of the vehicle 100, for example, the front camera is in the front portion of the vehicle 100, and the position of the camera 101 of the vehicle 100 itself also moves, it may be seen that when the front wheel of the vehicle 100 passes through the speed bump, the change in height of the license plate 202 is relatively greater than when the front wheel of the front vehicle 200 passes through the speed bump. Furthermore, when the rear wheel of the vehicle 100 passes through the speed bump, it may be seen that the change in height of the license plate is relatively smaller than when the rear wheel of the front vehicle 200 passes through the speed bump. Accordingly, the vehicle 100 may not perform signal processing by identifying the graph pattern 1404 according to the according to the passage of the speed bump of the vehicle 100 as the noise.

For example, the vehicle 100 may preset a first threshold value of change in height of the license plate 202 in a first vertical direction and a second threshold value of change in height of the license plate 202 in a second vertical direction based on the graph pattern 1402 according to the according to the passage of the speed bump of the front vehicle 200 and/or the graph pattern 1404 according to the according to the passage of the speed bump of the vehicle 100. When the vehicle 100 identifies a pattern including the change in height exceeding the first threshold value and/or the second threshold value, the vehicle 100 may not perform the signal processing so as not to be mistaken as having the speed bump in front of the vehicle 100.

Furthermore, in addition to the above-described embodiment, the vehicle 100 may identify the height of the speed bump, and the operation of identifying the height of the speed bump of the vehicle 100 will be described in detail with reference to FIGS. 15A to 15C.

Figure 15A:
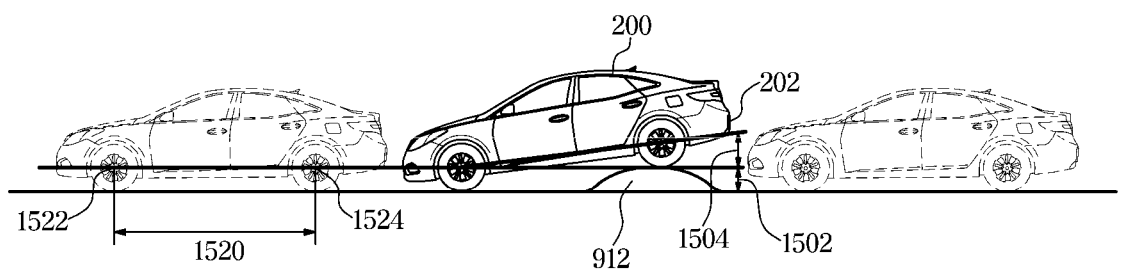
FIG. 15A, FIG. 15B and FIG. 15C are views for describing an operation of identifying a height of a speed bump of a vehicle according to various exemplary embodiments of the present invention.
Figure 15B:
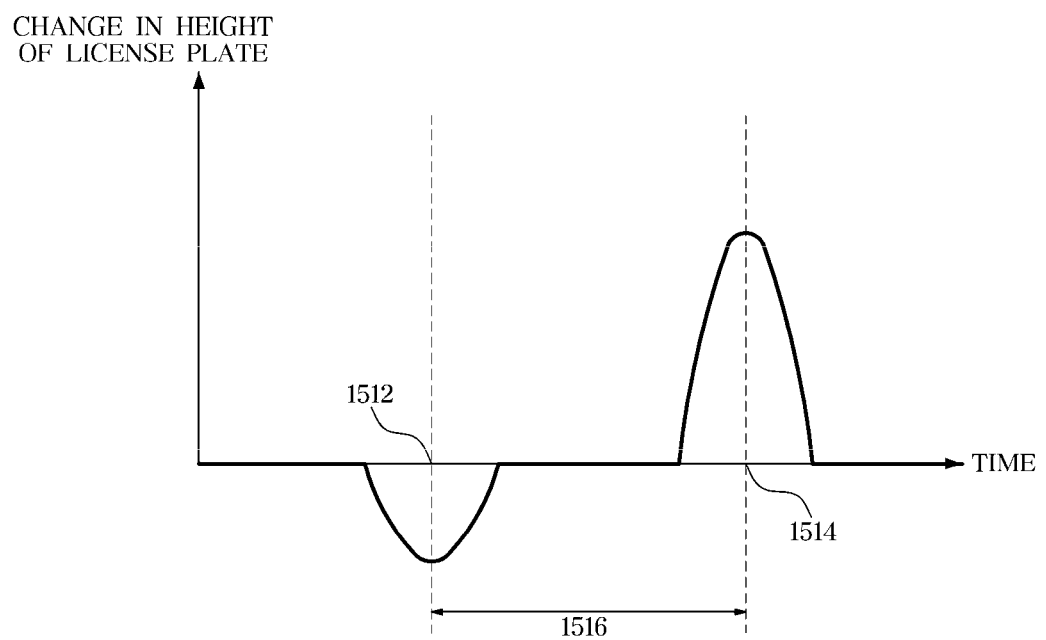
Figure 15C:
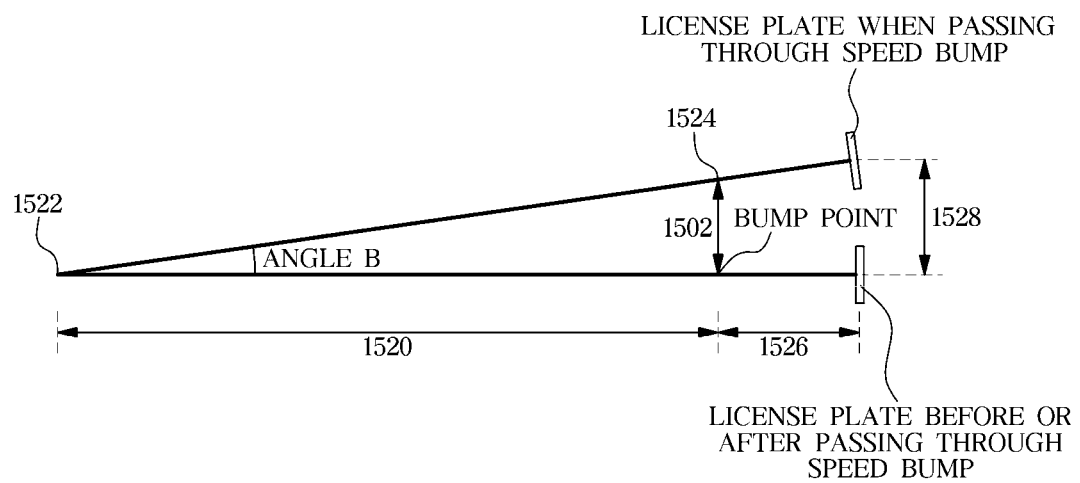

FIG. 15A, FIG. 15B and FIG. 15C are views for describing an operation of identifying a height of a speed bump of a vehicle according to various exemplary embodiments of the present invention.

As illustrated in FIG. 15A, when the front vehicle 200 passes through the speed bump 912 and drives on the road, the change in height 1504 of the license plate 202 of the front vehicle 200 may be slightly lower than the height 1502 of the speed bump 912. In other words, the change in height 1504 of the license plate 202 may be a little greater than or almost close to the height 1502 of the speed bump 912.

The vehicle 100 may determine a distance 1520 between the front and rear wheels of the front vehicle 200 based on the change in distance between the vehicle 100 and the front vehicle 200, the speed of the vehicle 100, and the change in height of the license plate 200 of the front vehicle 200. The change in the distance between the vehicle 100 and the front vehicle 200 may be referred to as the change in the distance between the vehicle 100 and the license plate 200 of the front vehicle 200. The distance 1520 between the front wheel and the rear wheel of the front vehicle 200 may be referred to as the distance 1520 between a front wheel axis 1522 and a rear wheel axis 1524. For example, the vehicle 100 may determine the speed of the front vehicle 200 by multiplying the current speed of the vehicle 100 and the change in the distance between the vehicle 100 and the front vehicle 200.

Referring to FIG. 15B, the vehicle 200 may identify an elapsed time (or also referred to as a time interval) from a time point 1512 at which the first height of the license plate 202 before the front vehicle 200 passes through the speed bump is changed in the downward direction and then starts to change to the first height again to a time point 1516 at which the license plate 202 is changed in the upward direction and then starts to change to the first height again.

For example, based on the change in height of the license plate 202 of the front vehicle 200, the vehicle 100 may identify the time point 1512 when the front wheel of the front vehicle 200 passes the speed bump 1512 and the time point 1514 when the rear wheel of the front vehicle 200 passes through the speed bump. In the graph pattern according to the according to the passage of the speed bump of the front vehicle 200, the vehicle 100 may identify the time point 1512 when the first height of the license plate 202 before passing through the speed bump is changed in the downward direction and then starts to change to the first height again, that is, the time point 1512 corresponding to a maximum height when the license plate 202 moves in the downward direction thereof, as the time point 1512 at which the front wheel of the front vehicle 200 passes the speed bump.

In the graph pattern according to the according to the passage of the speed bump of the front vehicle 200 after the time point 1512 when the front wheel passes through the speed bump, the vehicle 100 may identify the time point 1516 at which the license plate 202 of the first height starts to change back to the first height after the license plate 202 is changed in the upward direction, that is, the time point 1514 corresponding to the maximum height when the license plate 202 moves in the second vertical direction as the time point 1514 at which the rear wheel of the front vehicle 200 passes the speed bump.

The vehicle 100 may determine the elapsed time 1516 from the point time 1512 when the front wheel of the front vehicle 200 passes through the speed bump to the time point 1514 when the rear wheel of the front vehicle 200 passes through the speed bump.

The vehicle 100 may determine the distance 1520 between the front wheel axis 1522 and the rear wheel axis 1524 of the front vehicle 200 by multiplying the determined driving speed of the front vehicle 200 and the elapsed time 1516 with each other.

Referring to FIG. 15C, the vehicle 100 may determine the height of the speed bump 912 based on the distance 1520 between the front wheel axis 1522 and the rear wheel axis 1524 of the front vehicle 200, the distance 1526 between the rear wheel axis 1524 and the license plate 202, and the change in height 1528 of the license plate 202 before or after passing through the speed bump of the rear wheel of the front vehicle 200 and before or after passing through the speed bump. Before or after passing through the speed bump, it may correspond to driving on a flat section of the road. For example, when the speed bump of the rear wheel of the front vehicle 200 passes by the vehicle 100, the change in height 1528 of the license plate 202 may be identified by determining a difference value between the height of the license plate 202 of the front vehicle 200 after the front vehicle 200 completely passes through the speed bump.

The position of the license plate 202 when passing through the speed bump and the position of the license plate 202 before or after the passage of the speed bump cannot be said to be perpendicular to each other, but since the difference between the two positions is very small, in the present exemplary embodiment of the present invention, it is assumed that the two positions are perpendicular to each other. For example, the vehicle 100 may determine the height of the speed bump 912 based on Equations 1 and 2 below.

Height of speed bump=tan(B)×distance between front and rear wheel axles of front vehicle   [Equation 1]

tan(B)=change in height of license plate/(distance between front wheel axis and rear wheel axis of front vehicle+distance between rear wheel axis of front vehicle and license plate of front vehicle)   [Equation 2]

The distance between the rear wheel axis of the front vehicle 200 and the license plate 202 of the front vehicle 200 in Equation 2 may be a predetermined value (or also referred to as a constant). For example, the distance between the rear wheel axis of vehicles and the license plate may be similar. Accordingly, the distance between the rear wheel axis of vehicles and the license plate is actually measured, and an average distance value may be referred to as the distance between the rear wheel axis of the front vehicle 200 and the license plate 202 of the front vehicle 200.

Furthermore, in addition to the above-described embodiment, when identifying the change in height of the license plate 202 of the front vehicle 200 according to the according to the passage of the speed bump, the vehicle 100 may identify the distance between the vehicle 100 and the speed bump based on at least one of the plurality of image data corresponding to the change in height of the license plate 202 and reference distance information corresponding to each of reference image data of the plurality of reference license plates stored in the storage 103.

For example, the vehicle 100 may identify the reference image data corresponding to at least one of the plurality of image data corresponding to the change in height of the license plate 202 among reference image data of the plurality of reference license plates stored in the storage 103. The vehicle 100 may identify the reference distance information corresponding to the identified reference image data as the distance between the vehicle 100 and the speed bump.

Furthermore, in addition to the above-described embodiment, when it is identified that there is the speed bump in front of the vehicle 100, the vehicle 100 may output information that there is the speed bump in front of the vehicle 100 through an output device, for example, a speaker and/or a display device, so that a user can recognize the speed bump. For example, the information that there is the speed bump in the front may include distance information between the vehicle 100 and the speed bump and/or height information related to the speed bump.

Further, in addition to the above-described embodiment, when it is identified that there is the speed bump in front of the vehicle 100, the vehicle 100 may control, that is, reduce the driving speed. For example, the vehicle 100 may control the driving speed of the vehicle 100 based on the distance information between the vehicle 100 and the speed bump or the height information related to the speed bump to improve the user's riding comfort when the vehicle 100 passes the speed bump.

Furthermore, in addition to the above-described embodiment, the vehicle 100 may further include a distance measuring device. For example, the distance measuring device may include a radio detecting and ranging (radar) configured for measuring a direction and a distance of a target object based on a reception of a reflected wave reflected from a surface of the target object according to a radiation of electromagnetic waves and/or a Light Detection And Ranging (LiDAR) configured for measuring the direction to the target object based on light reflected from the target object by irradiating the target object with a laser. For example, the vehicle 100 may obtain the distance information between the vehicle 100 and the front vehicle 200 driving in front of the vehicle 100 based on a control of the distance measuring device.

The vehicle and the method of controlling the vehicle according to an aspect may provide a new technology for identifying the speed bump in front of the. For example, it is possible to provide a new technology configured for identifying information related to the speed bump that is not provided by the navigation and/or information related to the speed bump that the vehicle in motion cannot identify due to a failure in recognized the pattern of the speed bump.

The vehicle and the method of controlling the vehicle according to an aspect may provide information by identifying the height of the speed bump as well as the position of the speed bump on the road. For example, the vehicle may adjust the driving speed and a suspension strength when the vehicle passes through the speed bump based on the position and height of the speed bump on the road. Accordingly, when the vehicle is operated by autonomous driving or smart cruise control, it is possible to improve a riding comfort of passengers of the vehicle by adjusting the driving speed and the suspension strength when the vehicle passes the speed bump based on the position and height of the speed bump on the road.

The vehicle and the method of controlling the vehicle according to an aspect may improve the safety of the vehicle by identifying that the vehicle passes the speed bump of the front vehicle. Furthermore, the vehicle may predict the vehicle speed of the front vehicle based on identification of passing through the speed bump of the front vehicle, facilitating the autonomous driving of the vehicle or operation control of the smart cruise control.

The disclosed exemplary embodiments may be implemented in the form of a recording medium storing computer-executable instructions that are executable by a processor. The instructions may be stored in the form of a program code, and when executed by a processor, the instructions may generate a program module to perform operations of the disclosed exemplary embodiments. The recording medium may be implemented non-transitory as a non-transitory computer-readable recording medium.

The non-transitory computer-readable recording medium may include all types of recording media storing commands which may be interpreted by a computer. For example, the non-transitory computer-readable recording medium may be, for example, ROM, RAM, a magnetic tape, a magnetic disc, flash memory, an optical data storage device, and the like.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
   a camera;
   a storage; and
   a controller electrically connected to the camera and the storage,
   wherein the controller is configured to:
   obtain a front image of the vehicle from the camera by controlling the camera,
   in a response to obtaining the front image, identify image data corresponding to a license plate of a front vehicle positioned in front of the vehicle from the front image,
   identify a decrease in a distance between the vehicle and the front vehicle according to the image data and reference distance information corresponding to at least one reference image data of at least one reference license plate stored in the storage,
   identify a change in height of the license plate of the front vehicle according to the image data, and
   according to the decrease in the distance between the vehicle and the front vehicle and the change in height of the license plate of the front vehicle, identify a speed bump located in front of the vehicle,
   wherein the image data includes a plurality of image data corresponding to a passage of time, and
   wherein, in a response to the identification of the change in height of the license plate of the front vehicle, the controller is further configured to identify a distance between the vehicle and the speed bump according to at least one of the plurality of image data corresponding to the change in height of the license plate and the reference distance information corresponding to the at least one reference image data of the at least one reference license plate stored in the storage.

2. The vehicle according to claim 1, wherein the controller is configured to control a driving speed of the vehicle according to the identification of the speed bump.

3. The vehicle according to claim 1,
wherein the controller is configured to:
identify the change in height in a vertical direction of the license plate according to a position comparison of pixel values between the plurality of image data, and
identify a presence of the speed bump in front of the vehicle according to the identification of the change in height of the license plate.

4. The vehicle according to claim 3,
wherein the plurality of image data includes first image data of a first time point, second image data of a second time point after the first time point, and third image data of a third time point after the second time point, and
wherein the controller is configured to:
change a position of pixel values of the second image data in a first vertical direction from a position of pixel values of the first image data, and
according to a fact that a position of pixel values of the third image data is a position changed in a second vertical direction opposite to the first vertical direction from the position of the pixel values of the second image data, identify that the license plate of a first height is changed to the first height after changing in a downward direction.

5. The vehicle according to claim 4,
wherein the plurality of image data includes fourth image data of a fourth time point after the third time point, and fifth image data of a fifth time point after the fourth time point, and
wherein the controller is configured to:
change a position of pixel values of the fourth image data in the second vertical direction from the position of pixel values of the third image data, and
according to a fact that a position of pixel values of the fifth image data is the position changed in the first vertical direction from the position of the pixel values of the fourth image data, identify that the license plate of the first height is changed to the first height after changing in an upward direction.

6. The vehicle according to claim 3, wherein the controller is configured to:
generate a pattern corresponding to the change in height of the license plate over a passage of time,
remove a noise in the pattern corresponding to the change in height of the license plate via a predetermined noise filter, and
identify a position of the speed bump located in front of the vehicle according to the noise-removed pattern.

7. The vehicle according to claim 3, wherein the controller is configured to:
determine a driving speed of the front vehicle according to a driving speed of the vehicle and a change in a distance between the vehicle and the front vehicle,
identify an elapsed time from a time point at which the license plate of a first height is changed in a downward direction and then starts to change to the first height again to a time point at which the license plate is changed in an upward direction and then starts to change to the first height again, and
determine a height of the speed bump according to the driving speed of the front vehicle and the elapsed time of the front vehicle.

8. The vehicle according to claim 7, wherein the controller is configured to:
determine a distance between a front wheel axis and a rear wheel axis of the front vehicle according to the driving speed of the front vehicle and the elapsed time of the front vehicle,
determine a difference value between the first height of the license plate and a second height of the license plate changed in the upward direction, and
determine the height of the speed bump according to the distance between the front wheel axis and the rear wheel axis, the difference value, and a predetermined distance between the rear wheel axle and the license plate.

9. A method of controlling a vehicle, the method including:
obtaining, by a controller, a front image of the vehicle;
in a response to obtaining the front image, identifying, by the controller, image data corresponding to a license plate of a front vehicle of the vehicle from the front image;
identifying, by the controller, a decrease in a distance between the vehicle and the front vehicle according to the image data and reference distance information corresponding to at least one reference image data of at least one reference license plate stored in a storage electrically connected to the controller;
identifying, by the controller, a change in height of the license plate of the front vehicle according to the image data; and
according to the decrease in the distance between the vehicle and the front vehicle and the change in height of the license plate of the front vehicle, identifying, by the controller, a speed bump located in front of the vehicle,
wherein the image data includes a plurality of image data corresponding to a passage of time, and
the method further including:
in a response to the identification of the change in height of the license plate of the front vehicle, identifying, by the controller, a distance between the vehicle and the speed bump according to at least one of the plurality of image data corresponding to the change in height of the license plate and the reference distance information corresponding to the at least one reference image data of the at least one reference license plate stored in the storage.

10. The method according to claim 9, further including:
controlling, by the controller, a driving speed of the vehicle according to the identification of the speed bump.

11. A non-transitory computer readable storage medium on which a program for performing the method of claim 9 is recorded.

12. The method according to claim 9,
wherein the identifying of the speed bump located in front of the vehicle includes:
identifying the change in height in a vertical direction of the license plate according to a position comparison of pixel values between the plurality of image data, and
identifying a presence of the speed bump in front of the vehicle according to the identification of the change in height of the license plate.

13. The method according to claim 12,
wherein the plurality of image data includes first image data of a first time point, second image data of a second time point after the first time point, and third image data of a third time point after the second time point, and
wherein the identifying of the change in height of the license includes:
   changing a position of pixel values of the second image data in a first vertical direction from a position of pixel values of the first image data, and
   according to a fact that a position of pixel values of the third image data is a position changed in a second vertical direction opposite to the first vertical direction from the position of the pixel values of the second image data, identifying that the license plate of a first height is changed to the first height after changing in a downward direction.

14. The method according to claim 13,
wherein the plurality of image data includes fourth image data of a fourth time point after the third time point, and fifth image data of a fifth time point after the fourth time point, and
wherein the identifying of the change in height of the license includes:
   changing a position of pixel values of the fourth image data in the second vertical direction from the position of pixel values of the third image data, and
   according to a fact that a position of pixel values of the fifth image data is the position changed in the first vertical direction from the position of the pixel values of the fourth image data, identifying that the license plate of the first height is changed to the first height after changing in an upward direction.

15. The method according to claim 12, wherein the identifying of the speed bump located in front of the vehicle includes:
   generating a pattern corresponding to the change in height of the license plate over a passage of time;
   removing a noise in the pattern corresponding to the change in height of the license plate via a predetermined noise filter; and
   identifying a position of the speed bump located in front of the vehicle according to the noise-removed pattern.

16. The method according to claim 12, further including:
   determining, by the controller, a driving speed of the front vehicle according to a driving speed of the vehicle and a change in a distance between the vehicle and the front vehicle;
   identifying, by the controller, an elapsed time from a time point at which the license plate of a first height is changed in a downward direction and then starts to change to the first height again to a time point at which the license plate is changed in an upward direction and then starts to change to the first height again; and
   determining, by the controller, a height of the speed bump according to the driving speed of the front vehicle and the elapsed time of the front vehicle.

17. The method according to claim 16, wherein the determining of the height of the speed bump includes:
   determining a distance between a front wheel axis and a rear wheel axis of the front vehicle according to the driving speed of the front vehicle and the elapsed time of the front vehicle;
   determining a difference value between the first height of the license plate and a second height of the license plate changed in the upward direction; and
   determining the height of the speed bump according to the distance between the front wheel axis and the rear wheel axis, the difference value, and a predetermined distance between the rear wheel axle and the license plate.

* * * * *